(12) United States Patent
Sheppard et al.

(10) Patent No.: US 7,714,094 B2
(45) Date of Patent: May 11, 2010

(54) SIMPLIFIED ISOPHTHALIC ACID PROCESS FOR MODIFYING PET

(75) Inventors: Ronald Buford Sheppard, Kingsport, TN (US); Brent Alan Tennant, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/940,578

(22) Filed: Nov. 15, 2007

(65) Prior Publication Data

US 2009/0131626 A1    May 21, 2009

(51) Int. Cl.
*C08G 63/02* (2006.01)
(52) U.S. Cl. ............... 528/272; 528/271; 528/308; 528/308.1
(58) Field of Classification Search ........ 528/272, 528/35.7, 176, 285, 99, 301, 279, 98, 271, 528/308, 308.1; 524/398, 99; 428/35.7; 562/486, 593
See application file for complete search history.

(56) References Cited

U.S. PATENT DOCUMENTS

| | | | |
|---|---|---|---|
| 2,833,816 A | | 5/1958 | Saffer et al. |
| 2,865,891 A | * | 12/1958 | Michel ............... 528/301 |
| 3,089,906 A | | 5/1963 | Saffer et al. |
| 3,584,039 A | | 6/1971 | Meyer |
| 4,133,801 A | | 1/1979 | Morimatsu et al. |
| 4,158,738 A | | 6/1979 | Scott et al. |
| 4,314,073 A | | 2/1982 | Crooks |
| 5,132,450 A | | 7/1992 | Tanaka et al. |
| 5,770,765 A | | 6/1998 | Ohkoshi |
| 6,265,608 B1 | | 7/2001 | Sumner et al. |
| 6,350,851 B1 | | 2/2002 | Inada et al. |
| 6,559,271 B2 | | 5/2003 | Schaaf et al. |
| 6,762,276 B2 | | 7/2004 | Sumner et al. |
| 6,863,988 B2 | | 3/2005 | Tibbitt et al. |
| 6,913,817 B2 | | 7/2005 | Klein et al. |
| 7,074,879 B2 | | 7/2006 | DeBruin et al. |
| 7,074,954 B2 | | 7/2006 | Sheppard et al. |
| 7,098,360 B2 | | 8/2006 | Holl et al. |
| 7,556,784 B2 | | 7/2009 | Lin et al. |
| 2004/0073059 A1 | | 4/2004 | Lin |
| 2006/0047165 A1 | | 3/2006 | Lin et al. |
| 2006/0047166 A1 | | 3/2006 | Lin et al. |
| 2006/0110557 A1 | * | 5/2006 | Xia et al. ............ 428/35.7 |
| 2006/0205975 A1 | | 9/2006 | Lavoie et al. |
| 2006/0205977 A1 | | 9/2006 | Sumner et al. |
| 2007/0027340 A1 | | 2/2007 | Lee et al. |
| 2007/0203361 A1 | | 8/2007 | Parker et al. |
| 2008/0064797 A1 | | 3/2008 | Bashir et al. |

FOREIGN PATENT DOCUMENTS

| | | |
|---|---|---|
| IN | 200400569 | 6/2006 |
| JP | 55100118 | 7/1980 |
| JP | 2000128968 | 5/2000 |

OTHER PUBLICATIONS

Fred W. Billmeyer Jr., "Principles of Color Technology," pp. 25-66 by John Wiley & Sons, New York (1981).
Kirk-Othmer, "Encyclopedia of Chemical Technology," 4th Edition, vol. 18, pp. 1009-1023, John Wiley & Sons.
International Search Report dated May 22, 2009, in corresponding application PCT/US2008/012261.

* cited by examiner

*Primary Examiner*—Ling-Siu Choi
*Assistant Examiner*—Frances Tischler
(74) *Attorney, Agent, or Firm*—Jennifer R. Knight; Bernard J. Graves, Jr.

(57) ABSTRACT

Disclosed are modified PET polymer compositions and process for making modified PET polymer compositions by reacting purified terephthalic acid and non-hydrogenated isophthalic acid with ethylene glycol. Compositions with acceptable visual appearance, such as clarity and color, can be made at typical modification levels for many packaging application. Disclosed are also shaped articles and the process for making shaped articles of the modified PET polymer composition.

34 Claims, 1 Drawing Sheet

SIMPLIFIED ISOPHTHALIC ACID PROCESS FOR MODIFYING PET

FIELD OF THE INVENTION

This invention pertains to polyester compositions and a process for producing polyester compositions that are useful in packaging, such as in the manufacture of beverage containers. The polyester compositions are produced from purified terephthalate acid and a crude modifying carboxylic acid, non-hydrogenated isophthalic acid. Compositions with acceptable visual appearance, such as clarity and color, can be made at typical modification levels for many packaging applications. The invention also pertains to shaped articles of the polymer compositions and the process for making shaped articles of the polyester compositions.

BACKGROUND OF THE INVENTION

Polyethylene terephthalate (PET) is a well-known plastic used in great quantities around the world to make products such as bottles, fibers, and packaging. PET is a polyester of terephthalic acid (TPA) and ethylene glycol. Often PET is modified with a carboxylic acid other than TPA and/or a diol other than ethylene glycol to enhance particular physical properties. For example, isophthalic acid is added as a partial replacement to terephthalic acid in commercial polyester production processes to change the morphology of the resultant polyester product. Typical modification levels are 0-5 mole % replacement of primary terephthalic acid, resulting in more desirable properties of the polyester produced. These improved properties include, for example, reduced crystallization rate and improved barrier properties for packaging resins.

As the business of manufacturing polyesters becomes more competitive, alternative manufacturing processes have become highly desirable. Manufacturing costs can be removed from the production of the polyester itself or the production of the raw materials used to make the polyester.

Commercial isophthalic acid (IPA) typically is produced using the same basic process steps as terephthalic acid, but starting with a meta-xylene feed. Commercial isophthalic acid contains low levels of impurities. Like commercial terephthalic acid, this is important for most applications where isophthalic acid is used in significant quantities. It can be appreciated that the importance of absolute purity of the isophthalic acid diminishes as the amount of isophthalic acid used is a lower overall fraction of the monomer mix for making the polyester.

The isophthalic acid production process can be divided into the oxidation zone and the hydrogenation zone. Crude isophthalic acid is produced in the oxidation zone. The crude (or non-hydrogenated) IPA is purified (or hydrogenated) in the hydrogenation zone. The hydrogenation zone typically includes the following steps: (1) replacing the mother liquor of the crude IPA-containing slurry with water, (2) heating the crude IPA/water slurry to dissolve the crude IPA in water, (3) catalytically hydrogenating the crude IPA/water solution to convert impurities to more desirable and/or easily-separable compounds, (4) precipitating the resulting purified IPA from the hydrogenated solution via multiple crystallization steps, and (5) separating the crystallized purified IPA from the remaining liquids. Although effective, this type of conventional purification process can be very expensive. Individual factors contributing to the high cost of conventional crude IPA purification methods include, for example, the heat energy required to promote dissolution of the crude IPA in water, the catalyst required for hydrogenation, the hydrogen stream required for hydrogenation, the yield loss caused by hydrogenation of some isophthalic acid, and the multiple vessels required for multi-step crystallization.

There is a need in the polyester business to decrease the costs of manufacturing PET. This invention relates to production of isophthalic acid of suitable quality without hydrogenation (i.e., non-hydrogenated IPA) for commercial use in polyester processes. Eliminating the hydrogenation zone of the IPA process significantly reduces the capital and operating costs of this PET modifier.

SUMMARY OF THE INVENTION

It has been found that crude isophthalic acid directly from an oxidation process without the need for further purification such as hydrogenation is suitable as a PET modifier at levels up to 7 mole % replacement of the terephthalic acid without significant impact on the PET properties.

We have discovered a process for producing a modified polyethylene terephthalate (PET) polymer. The process includes reacting non-hydrogenated isophthalic acid with terephthalic acid and ethylene glycol to produce a modified PET polymer comprising about 0.5 mole % to about 7 mole % isophthalic acid residues, based upon 100 mole % carboxylic acid residues. The modified PET polymer has a disc L* of at least about 60.

In another embodiment, we have discovered a process for producing a modified PET polymer. The process includes reacting isophthalic acid and terephthalic acid with ethylene glycol, to produce a modified PET polymer having a disc L* of at least about 60 which comprises:
  i. a carboxylic acid component comprising
     a. about 0.5 mole % to about 7 mole % isophthalic acid residues;
     b. at least about 90 mole % terephthalic acid residues; and
  ii. a hydroxyl component comprising at least about 90 mole % ethylene glycol residues, based on 100 mole percent of carboxylic acid component residues and 100 mole percent of hydroxyl component residues in the modified PET polymer. The isophthalic acid comprises at least:
  i. about 100 ppm to about 10,000 ppm 3-CBA;
  ii. about 20 ppm to about 500 ppm fluorenones; or
  iii. at least about 50 ppm to about 10,000 ppm 3-CBA in combination with at least about 10 ppm to about 500 ppm fluorenones.

In another embodiment, we have discovered a process for producing a modified PET polymer. The process includes reacting isophthalic acid and terephthalic acid with ethylene glycol to produce a modified PET polymer having a disc L* of at least about 60 which comprises:
  i. a carboxylic acid component comprising
     a. about 0.5 mole % to about 7 mole % isophthalic acid residues;
     b. at least about 90 mole % terephthalic acid residues; and
  ii. a hydroxyl component comprising at least about 90 mole % ethylene glycol residues based upon 100 mole % carboxylic acid component residues and 100 mole % hydroxyl component residues.

The non-hydrogenated isophthalic acid is produced by a process consisting essentially of:
  a. oxidizing m-xylene;
  b. crystallizing isophthalic acid;
  c. washing isophthalic acid; and
  d. drying isophthalic acid.

In another embodiment, we have discovered a process for producing a shaped article comprising, reacting non-hydrogenated isophthalic acid with terephthalic acid and ethylene glycol to produce a modified PET polymer comprising about 0.5 mole % to about 7 mole % isophthalic acid residues, based upon 100 mole % carboxylic acid residues. The modified PET has a disc L* of at least about 60. The shaped article is formed from the modified PET polymer.

In another embodiment, we have discovered a process for producing a shaped article. The process comprises: reacting isophthalic acid and terephthalic acid with ethylene glycol to produce a modified PET polymer having a disc L* of at least about 60 which comprises:
 a. a carboxylic acid component comprising
  (A) about 0.5 mole % to about 7 mole % isophthalic acid residues;
  (B) at least about 90 mole % terephthalic acid residues; and
 b. a hydroxyl component comprising at least about 90 mole % ethylene glycol residues, based on 100 mole percent of carboxylic acid component residues and 100 mole percent of hydroxyl component residues in the modified PET polymer. The isophthalic acid comprises at least:
 a. about 100 ppm to about 10,000 ppm 3-CBA;
 b. about 20 ppm to about 500 ppm fluorenones; or
 c. at least about 50 ppm to about 10,000 ppm 3-CBA in combination with at least about 10 ppm to about 500 ppm fluorenones.

The shaped article is formed from the modified PET polymer.

In another embodiment, we have discovered a modified PET polymer having a disc L* of at least about 60. The modified PET polymer comprises:
 i. a carboxylic acid component comprising
  a. from about 0.5 mole % to about 7 mole % isophthalic acid residues;
  b. at least about 90 mole % of the terephthalic acid residues; and
 ii. a hydroxyl component comprising at least about 90 mole % of ethylene glycol residues, based on 100 mole percent of carboxylic acid component residues and 100 mole percent of hydroxyl component residues in the modified PET polymer. The modified PET polymer is produced by a process comprising reacting isophthalic acid and terephthalic acid with ethylene glycol. The isophthalic acid comprises at least:
 i. about 100 ppm to about 10,000 ppm 3-CBA;
 ii. about 20 ppm to about 500 ppm fluorenones; or
 iii. at least about 50 ppm to about 10,000 ppm 3-CBA in combination with at least about 10 ppm to about 500 ppm fluorenones.

In another embodiment, we have discovered a shaped article produced from a modified PET polymer having a disc L* of at least about 60. The modified PET polymer comprises:
 i. a carboxylic acid component comprising
  a. at least about 90 mole % of the residues of terephthalic acid
  b. from about 0.5 mole % to about 7 mole % isophthalic acid residues; and
 ii. a hydroxyl component comprising at least about 90 mole % of the residues of ethylene glycol, based on 100 mole percent of carboxylic acid component residues and 100 mole percent of hydroxyl component residues in the modified PET polymer. The modified PET polymer is produced by a process comprising: reacting isophthalic acid and terephthalic acid with ethylene glycol. The isophthalic acid comprises at least:
 i. about 100 ppm to about 10,000 ppm 3-CBA;
 ii. about 20 ppm to about 500 ppm fluorenones; or
 iii. at least about 50 ppm to about 10,000 ppm 3-CBA in combination with at least about 10 ppm to about 500 ppm fluorenones.

BRIEF DESCRIPTION OF THE DRAWING

Certain embodiments of the invention are described in detail below with reference to the enclosed figure, wherein.

DETAILED DESCRIPTION

Definitions

Figure 1:
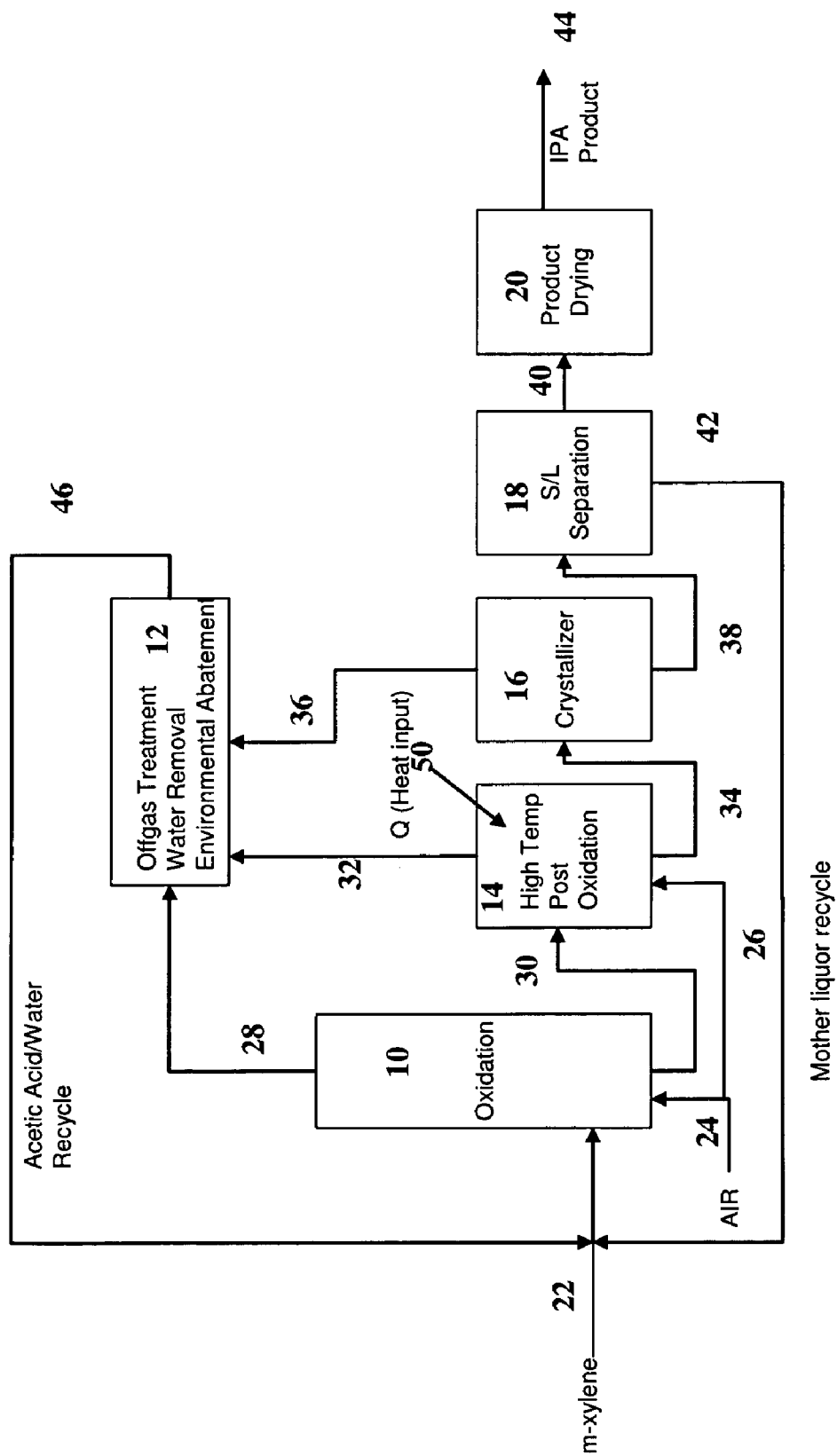
FIG. 1 is a schematic representation of an isophthalic acid process in accordance with one embodiment of the present invention.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

To the extent the definitions of terms in the publications, patents, and patent applications incorporated herein by reference are not the same as the definitions set forth in this specification, the definitions in this specification control for the entire specification, including the claims. Any other definitions in the publications, patents, and patent applications incorporated herein by reference that are not explicitly provided in this specification apply only to the embodiments discussed in the publications, patents, and patent applications incorporated herein by reference.

It is also to be understood that the mention of one or more method steps does not preclude the presence of additional method steps before or after the combined recited steps or intervening method steps between those steps expressly identified. Moreover, the lettering of process steps is a convenient means for identifying discrete activities or steps, and unless otherwise specified, recited process steps can be arranged in any sequence.

"Batch" refers to a process wherein reactants are fed, reactions and separations take place, and products are withdrawn in a predetermined, time-sequenced series of steps.

"Carboxylic acid residues" or "carboxylic acid component residues" refers to the carboxylic acid moiety that is present in the polyester. It is understood that these residues can result from reacting carboxylic acids or the corresponding acid anhydrides, esters, and acid chlorides of a carboxylic acid.

"Continuous" or "continuously" refers to a process wherein reactants are introduced and products withdrawn simultaneously in an uninterrupted manner. By "continuous" or "continuously" it is meant that the process is substantially or completely continuous in operation in contrast to a "batch" process. "Continuous" or "continuously" is not meant in any way to prohibit normal interruptions in the continuity of the process due to, for example, start-up, reactor maintenance, or scheduled shut down periods.

"Dicarboxylic acid" refers to a dicarboxylic acids and any derivative of a dicarboxylic acid, including its associated acid halides, esters, half-esters, salts, half-salts, anhydrides, mixed anhydrides, or mixtures thereof, useful in a polycondensation with a diol to make a high molecular weight polyester. For example, derivatives of terephthalic acid and naphthalane dicarboxylic acid include $C_1$-$C_4$ dialkylterephthalates and $C_1$-$C_4$ dialkylnaphthalates, such as dimethylterephthalate and dimethylnaphthalate.

"Diol" refers to a dihydroxy compound useful in polycondensation with a dicarboxylic acid to make a high molecular weight polyester. Ethylene glycol is an example of a diol.

"Disc L*" refers to a measure of brightness as measured on discs. This value is measured in accordance with ASTM D 1746 for discs (transmission mode). An L* of 100 in a colorless sample in the transmittance mode would be perfectly transparent, while an L* of 0 in a colorless sample would be opaque. L* can also be measured on, for example, powders, plaques, preforms, and bottle sidewalls. Details on Disc L* measurement are given before Example 1 below. Color measurement theory and practice are discussed in greater detail in "Principles of Color Technology", pp. 25-66 by John Wiley & Sons, New York (1981) by Fred W. Billmeyer, Jr. Brightness is measured as L* in the CIE 1976 opponent-color scale, with 100% representing a colorless sample transmitting 100% at all wavelengths.

"Esterification reaction zone" refers to the process stage wherein a carboxylic acid and a hydroxyl react to form monomers and oligomers.

"Fluorenes" refers to diphenylene methane compounds. As would be understood by one skilled in the art, fluorenes can carry one or more substituents attached to the aromatic rings. Fluorenes can be produced as byproducts of the isophthalic acid oxidation that have been hydrogenated. These byproduct fluorenes typically have two dicarboxyllic acid groups substituted on the aromatic rings. An example byproduct fluorene, 2,7-dicarboxylfluorene, is represented by the structure below.

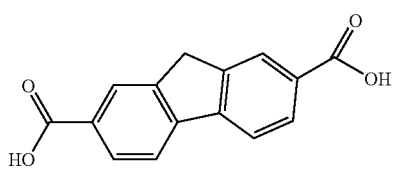

"Fluorenones" refers to diphenylene methanes having an oxo group at the 9 position. As would be understood by one skilled in the art, fluorenones can carry one or more substituents attached to the aromatic rings. Fluorenones can be produced as byproducts of the isophthalic acid oxidation. These byproduct fluorenones typically have two dicarboxyllic acid groups substituted on the aromatic rings. An example byproduct fluorenone, 2,7-dicarboxyfluorenone, is represented by the structure below.

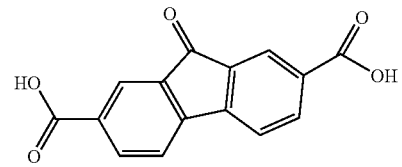

"Hydroxyl residues" or hydroxyl component residues" refers to the hydroxyl moiety that is present in the polyester.

"Intrinsic viscosity" or "It.V." refers to values set forth in dL/g units as calculated from the inherent viscosity measured at 25° C. in 60/40 wt/wt phenol/tetrachloroethane according to the calculations immediately prior to Example 1 below. Inherent and intrinsic viscosity are widely used as indirect measurements of molecular weight in polyester processes.

"Mixture" refers to a composition with more than one component where components are differentiated if they have different kinds of chemical entities (e.g., water and acetic acid) or different numbers of chemical entities (e.g., oligomers with different number average degrees of polymerization).

"Modified PET polymer" refers to a polyester in which at least 0.5 mole % of the primary carboxylic acid component residues or the primary hydroxyl component residues are replaced by reacting at least one additional monomer. Terephthalic acid component residues, and ethylene glycol component residues represent at least 80 mole % of the carboxylic acid residues and hydroxyl residues, respectively based upon 100 mole % carboxylic acid residues and 100 mole % hydroxyl residues. An example modified PET polymer is poly-ethylene terephthalate modified by reacting isophthalic acid such that at least 0.5 mole % of the carboxylic acid residues are isophthalic acid residues.

"Non-hydrogenated isophthalic acid" refers to isophthalic acid produced via oxidation of meta-xylene followed by such steps as separation, washing, drying, and the like. Non-hydrogenated isophthalic acid is purified without exposure to hydrogen gas. As compared with typical commercial isophthalic acid, the non-hydrogenated isophthalic acid has not been subjected to the well known carboxylic acid purification process of dissolution in a solvent such as water followed by hydrogenation, crystallization, separation, and drying.

"Oligomer mixture" refers to combinations of polymer precursors having from about 4 to about 50 number average degree of polymerization (components with 4 to 6 repeat units can be considered monomer or oligomer). Using PET as an example, a dimer, EG-TA-EG-TA-EG, has a number degree of polymerization of 2, and a trimer 3, and so on.

"Polycondensation zone" refers to the process stage having an oligomer mixture input and reacting the oligomer mixture to form a polymer mixture output. The number average degree of polymerization of the feed can be about 1 to about 50 with the polymer mixture output having an increased number average degree of polymerization of at least about 10.

"Polyester" refers to a synthetic polymer prepared by the polycondensation of one or more difunctional carboxylic acids with one or more difunctional hydroxyl compounds.

"Reacting" refers to processing chemicals under conditions that allow chemical reactions to occur to produce desired products. Conditions include, but are not limited to, temperature, pressure, and component concentrations. Reacting occurs when terephthalic acid, isophthalic acid, and ethylene glycol are processed to produce a copolyester, or modified PET polymer. Reacting also includes the condensation reaction wherein polymer precursors (monomers and oligomers) and/or polymers combine to form polymers of higher molecular weight.

"Repeating units" refers to an organic structure having a dicarboxylic acid residue and a hydroxyl residue bonded through a carbonyloxy group. For example, in PET a repeating unit is EG-TA.

"Residue" refers to the moiety that is the resulting product of the chemical species in a particular reaction scheme or subsequent formulation or chemical product, regardless of whether the moiety is actually obtained from the chemical species. The reaction of a dicarboxylic acid compound with a hydroxyl compound during the preparation of the polyester polymer is not restricted to the stated mole % ratios since one may utilize a large excess of a hydroxyl compound if desired, e.g. on the order of up to 200 mole % relative to the 100 mole % of polycarboxylic acid used. The polyester polymer made by the reaction does, however, contain the stated amounts of aromatic dicarboxylic acid residues and hydroxyl residues. Thus, an ethylene glycol residue in a polyester refers to one or more —$OCH_2CH_2O$— repeat units in the polyester regardless of whether ethylene glycol is used to prepare the polyester.

"Shaped article" refers to a solid, functional unit of manufacture made from a polymer. A shaped article includes, but is not limited to, a sheet, film, tube, perform, or bottle.

"Solid-state processing zone" refers to the process stage having a solid polymer feed which typically is heated in a gas stream below its melting point to increase the number average molecular weight.

One embodiment of the present invention includes reacting non-hydrogenated isophthalic acid with terephthalic acid to produce a modified PET polymer comprising about 0.5 mole % to about 7 mole % isophthalic acid residues, based upon 100 mole % carboxylic acid residues. The modified PET polymer has a disc L* of at least about 60.

In certain embodiments, one or more additional modifier dicarboxylic acids can be included in the reaction to produce the modified PET polymer. Such additional modifier dicarboxylic acids include aromatic dicarboxylic acids having 8 to 14 carbon atoms, aliphatic dicarboxylic acids having 4 to 12 carbon atoms, or cycloaliphatic dicarboxylic acids having 8 to 12 carbon atoms. Examples of additional modifier dicarboxylic acids useful as a carboxylic acid component(s) are naphthalene-2,6-dicarboxylic acid, phthalic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. It is also possible for trifunctional and higher order polycarboxylic acids to modify the polyester.

The hydroxyl component is made from hydroxyl compounds, which are compounds containing 2 or more hydroxyl groups capable of reacting with a carboxylic acid group. The primary hydroxyl component for PET is ethylene glycol. The hydroxyl compound component(s) may include modifier diols such as, for example, cycloaliphatic diols preferably having 6 to 20 carbon atoms and/or aliphatic diols preferably having 3 to 20 carbon atoms. Examples of such diols include diethylene glycol; propane-1,3-diol; butane-1,4-diol; triethylene glycol; 1,4-cyclohexanedimethanol; pentane-1,5-diol; hexane-1,6-diol; 3-methylpentanediol-(2,4); neopentyl glycol; 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate are made by reacting a glycol with a dicarboxylic acid as the free acid or its dimethyl ester to produce an ester monomer and/or oligomers, which are then polycondensed to produce the polyester.

In certain embodiments, in addition to isophthalic acid, the modified PET polymer may also be modified by naphthalenic dicarboxylic acid, trimellitic anhydride, pyromellitic dianhydride, butanediol, 1,4-cyclohexane dimethanol, 2,4-dihydroxy-1,1,3,3-tetramethyl-cyclobutane, trimethylene glycol, neopentyl glycol, diethylene glycol, or mixtures thereof.

In certain embodiments the modified PET polymer comprises non-hydrogenated isophthalic acid residues and at least about 90 mole %, 93 mole %, or 95 mole % of terephthalic acid residues. The modified PET polymer can also comprise a hydroxyl component comprising at least about 90 mole %, 93 mole %, or 95 mole % ethylene glycol residues. The mole percentages are based on 100 mole percent of carboxylic acid component residues and 100 mole percent of hydroxyl component residues in the modified PET polymer.

In certain embodiments, the modified PET polymer comprises at least about 0.5 mole % isophthalic acid residues and up to about 2 mole %, 3 mole %, 4 mole %, 5 mole %, 6 mole %, or 7 mole % isophthalic acid residues. In certain embodiments, the modified PET polymer comprises at least about 1 mole % isophthalic acid residues to about 3 mole %, 4 mole %, 5 mole %, 6 mole %, or 7 mole % isophthalic acid residues. In certain embodiments, the modified PET polymer comprises about 2 mole % isophthalic acid residues to about 4 mole % isophthalic acid residues.

In certain embodiments, the non-hydrogenated isophthalic acid comprises (i) at least about 50 ppm, 100 ppm, 200 ppm, 300 ppm and less than about 10,000 ppm, 5,000 ppm, 3,000 ppm, 2,000 ppm, 1,000 ppm, or 800 ppm of 3-CBA; (ii) at least about 20 ppm, 35 ppm, 50 ppm, 80 ppm, 100 ppm and less than about 500 ppm, 400 ppm, 300 ppm, 200 ppm, or 150 ppm fluorenones; or (iii) at least about 50 ppm, 75 ppm, 100 ppm, 150 ppm and less than about 10,000 ppm, 5,000 ppm, 3,000 ppm, 2,000 ppm, 1,000 ppm, or 800 ppm of 3-CBA in combination with at least about 10, ppm, 20 ppm, 25 ppm, 30 ppm, 40 ppm, or 50 ppm and less than about 500 ppm, 400 ppm, 300 ppm, 200 ppm, or 150 ppm of fluorenones.

In certain embodiments the modified PET polymer has a disc L* of at least about 60, 70, 80, or 90.

In certain embodiments, the modified PET polymer has an intrinsic viscosity (It.V.) of at least about 0.55 dL/g, 0.60 dL/g, 0.70 dL/g, 0.72 dL/g, 0.76 dL/g, or 0.80 dL/g and up to about 1.1 dL/g. The modified PET polymer may or may not have been subject to a solid-state processing zone. In other words, in certain embodiments, the modified PET polymer may reach its It.V. in the melt phase.

In certain embodiments, the process of reacting non-hydrogenated isophthalic acid with terephthalic acid and ethylene glycol to produce a modified PET polymer comprising about 0.5 mole % isophthalic acid residues to about 2 mole %, 3 mole %, 4 mole %, 5 mole %, 6 mole %, or 7 mole % isophthalic acid residues and at least about 90 mole % or 93 mole % terephthalic acid residues, and a hydroxyl component comprising at least about 90 mole % ethylene glycol residues, based upon 100 mole percent of carboxylic acid component residues and 100 mole percent of hydroxyl component residues in the modified PET polymer, further comprises (i) reacting non-hydrogenated isophthalic acid and terephthalic acid with ethylene glycol in an esterification reaction zone to produce an oligomer mixture; (ii) further reacting the oligomer mixture to produce the modified PET polymer in a melt-phase polycondensation zone; and (iii) optionally further increasing the modified PET polymer It.V. in a solid-state processing zone. Further, a mixture of the non-hydrogenated isophthalic acid, terephthalic acid, and ethylene glycol can be fed to the esterification zone. Alternatively, the non-hydrogenated isophthalic acid, terephthalic acid, and ethylene glycol can be fed to the esterification zone in a feed system comprising a first mixture comprising the non-hydrogenated isophthalic acid and ethylene glycol and a second mixture comprising terephthalic acid and ethylene glycol.

In certain embodiments, the esterification reaction zone has a throughput of at least about 500 kg/hr, 10,000 kg/hr, 50,000 kg/hr, and up to about 75,000 kg/hr, 100,000 kg/hr, 125,000 kg/hr, 150,000 kg/hr, or 175,000 kg/hr.

In another embodiment, we have discovered a process for producing a modified PET polymer. The process includes reacting isophthalic acid and terephthalic acid with ethylene glycol, to produce a modified PET polymer having a disc L* of at least about 60 which comprises:
  i. a carboxylic acid component comprising
    a. about 0.5 mole % to about 7 mole % isophthalic acid residues;
    b. at least about 90 mole % terephthalic acid residues; and
  ii. a hydroxyl component comprising at least about 90 mole % ethylene glycol residues, based on 100 mole percent of carboxylic acid component residues and 100 mole percent of hydroxyl component residues in the modified PET polymer, wherein the isophthalic acid comprises at least:
  i. about 100 ppm to about 10,000 ppm 3-CBA;
  ii. about 20 ppm to about 500 ppm fluorenones; or
  iii. at least about 50 ppm to about 10,000 ppm 3-CBA in combination with at least about 10 ppm to about 500 ppm fluorenones.

In certain embodiments the isophthalic acid can comprise impurities in the ranges given above. Also, the modified PET polymer can have compositions given above (including mole % isophthalic acid residues, mole % terephthalic acid residues, and mole % ethylene glycol residues as well as additional modifiers), the disc L* values given above, and the It.V. values given above.

In certain embodiments, the process comprises additional processing steps involving an esterification zone, a melt-phase polycondensation zone, and an optional solid-state polycondensation zone and the feed configurations described above. In certain embodiments, the esterification zone can have throughput values as described above.

In another embodiment, we have discovered a process for producing a modified PET polyester. The process includes reacting non-hydrogenated isophthalic acid and terephthalic acid with ethylene glycol to produce a modified PET polymer having a disc L* of at least about 60 which comprises:
  i. a carboxylic acid component comprising
    a. about 0.5 mole % to about 7 mole % isophthalic acid residues;
    b. at least about 90 mole % terephthalic acid residues; and
  ii. a hydroxyl component comprising at least about 90 mole % ethylene glycol residues based upon 100 mole % carboxylic acid component residues and 100 mole % hydroxyl component residues.

The isophthalic acid is produced by a process consisting essentially of:
  a. oxidizing m-xylene;
  b. crystallizing isophthalic acid;
  c. washing isophthalic acid; and
  d. drying isophthalic acid.

In certain embodiments, the non-hydrogenated isophthalic acid is produced by a process consisting essentially of: (a) oxidizing m-xylene; (b) crystallizing isophthalic acid; (c) washing isophthalic acid; and (d) drying isophthalic acid. The process steps listed are well known. These process steps represent a fraction of the process steps typically included in a commercial isophthalic acid process. By reducing the number of process steps a considerable amount of capital costs and energy costs can be saved.

By consisting essentially of the listed steps above, these embodiments do not include a process for producing a modified PET polymer comprising reacting isophthalic acid that has been hydrogenated. A typical, commercial hydrogenation zone includes dissolving the non-hydrogenated (or crude) isophthalic acid in a solvent, typically water, and hydrogenating the isophthalic acid in the presence of a hydrogenation catalyst, typically palladium on carbon. The purified isophthalic acid is then recrystallized, washed, and dried. The 3-CBA that is hydrogenated to m-toluic acid typically leaves with the solvent and the fluorenones that are hydrogenated to fluorenes have significantly improved color characteristics. Significant capital and energy costs are saved by excluding the hydrogenation zone as described herein.

In certain embodiments the non-hydrogenated isophthalic acid can comprise impurities in the ranges given above. Also, the modified PET polymer can have compositions given above (including mole % isophthalic acid residues, mole % terephthalic acid residues, and mole % ethylene glycol residues as well as additional modifiers), the disc L* values given above, and the It.V. values given above.

In certain embodiments, the process comprises additional processing steps involving an esterification zone, a melt-phase polycondensation zone, and an optional solid-state polycondensation zone and the feed configurations described above. In certain embodiments, the esterification zone can have throughput values as described above.

In another embodiment, we have discovered a process for producing a shaped article comprising, reacting non-hydrogenated isophthalic acid with terephthalic acid and ethylene glycol to produce a modified PET polymer comprising about 0.5 mole % to about 7 mole % isophthalic acid residues, based upon 100 mole % carboxylic acid residues. The modified PET polymer has a disc L* of at least about 60. The shaped article is formed from the modified PET polymer.

In certain embodiments the non-hydrogenated isophthalic acid can comprise impurities in the ranges given above. Also, the modified PET polymer can have compositions given above (including mole % isophthalic acid residues, mole % terephthalic acid residues, and mole % ethylene glycol residues as well as additional modifiers), the disc L* values given above, and the It.V. values given above.

In certain embodiments, the process for producing the modified PET polymer comprises additional processing steps involving an esterification zone, a melt-phase polycondensation zone, and an optional solid-state polycondensation zone and the feed configurations described above. In certain embodiments, the esterification zone can have throughput values as described above.

In certain embodiments the process of forming the shaped article from the modified PET polymer comprises: extrusion, calendaring, thermoforming, blow-molding, extrusion blow-molding, injection molding, compression molding, casting, drafting, tentering, or blowing. The modified PET polymer can be formed into a sheet, film, tube, preform, or bottle. The modified PET polymer can be formed into bottle.

In another embodiment, we have discovered a process for producing a shaped article. The process comprises: reacting isophthalic acid and terephthalic acid with ethylene glycol to produce a modified PET polymer having a disc L* of at least about 60 which comprises:

a. a carboxylic acid component comprising
  (A) about 0.5 mole % to about 7 mole % isophthalic acid residues;
  (B) at least about 90 mole % terephthalic acid residues; and
b. a hydroxyl component comprising at least about 90 mole % ethylene glycol residues, based on 100 mole percent of carboxylic acid component residues and 100 mole percent of hydroxyl component residues in the modified PET polymer, wherein the isophthalic acid comprises at least:

a. about 100 ppm to about 10,000 ppm 3-CBA;
b. about 20 ppm to about 500 ppm fluorenones; or
c. at least about 50 ppm to about 10,000 ppm 3-CBA in combination with at least about 20 ppm to about 500 ppm fluorenones.

The shaped article is formed from the modified PET polymer.

In certain embodiments the isophthalic acid can comprise impurities in the ranges given above. Also, the modified PET polymer can have compositions given above (including mole % isophthalic acid residues, mole % terephthalic acid residues, and mole % ethylene glycol residues as well as additional modifiers), the disc L* values given above, and the It.V. values given above.

In certain embodiments, the process for producing the modified PET polymer comprises additional processing steps involving an esterification zone, a melt-phase polycondensation zone, and an optional solid-state polycondensation zone and the feed configurations described above. In certain embodiments, the esterification zone can have throughput values as described above.

In certain embodiments the process of forming the shaped article from the modified PET polymer comprises: extrusion, calendaring, thermoforming, blow-molding, extrusion blow-molding, injection molding, compression molding, casting, drafting, tentering, or blowing. The modified PET polymer can be formed into a sheet, film, tube, preform, or bottle. The modified PET polymer can be formed into bottle.

In another embodiment, we have discovered a modified PET polymer having a disc L* of at least about 60. The modified PET polymer comprises:

i. a carboxylic acid component comprising
  a. from about 0.5 mole % to about 7 mole % isophthalic acid residues;
  b. at least about 90 mole % of the terephthalic acid residues; and
ii. a hydroxyl component comprising at least about 90 mole % ethylene glycol residue, based on 100 mole percent of carboxylic acid component residues and 100 mole percent of hydroxyl component residues in the modified PET polymer. The modified PET polymer is produced by reacting isophthalic acid and terephthalic acid with ethylene glycol. The isophthalic acid comprises at least:

i. about 100 ppm to about 10,000 ppm 3-CBA;
ii. about 20 ppm to about 500 ppm fluorenones; or
iii. at least about 50 ppm to about 10,000 ppm 3-CBA in combination with at least about 10 ppm to about 500 ppm fluorenones.

In certain embodiments the reacting isophthalic acid can comprise impurities in the ranges given above. Also, the modified PET polymer can have compositions given above (including mole % isophthalic acid residues, mole % terephthalic acid residues, and mole % ethylene glycol residues as well as additional modifiers), the disc L* values given above, and the It.V. values given above.

In another embodiment, we have discovered a shaped article produced from a modified PET polymer having a disc L* of at least about 60. The modified PET polymer comprises:

i. a carboxylic acid component comprising
  a. from about 0.5 mole % to about 7 mole % isophthalic acid residues
  b. at least about 90 mole % terephthalic acid residues; and
ii. a hydroxyl component comprising at least about 90 mole % ethylene glycol residues, based on 100 mole percent of carboxylic acid component residues and 100 mole percent of hydroxyl component residues in the modified PET polymer. The modified PET polymer is produced by reacting isophthalic acid and terephthalic acid with ethylene glycol. The isophthalic acid comprises at least:

i. about 100 ppm to about 10,000 ppm 3-CBA;
ii. about 20 ppm to about 500 ppm fluorenones; or
iii. at least about 50 ppm to about 10,000 ppm 3-CBA in combination with at least about 10 ppm to about 500 ppm fluorenones.

In certain embodiments the reacting isophthalic acid can comprise impurities in the ranges given above. Also, the modified PET polymer can have compositions given above (including mole % isophthalic acid residues, mole % terephthalic acid residues, and mole % ethylene glycol residues as well as additional modifiers), the disc L* values given above, and the It.V. values given above.

Certain embodiments include a shaped article produced from the modified PET polymer. The shaped article can be formed by extrusion, calendaring, thermoforming, blow-molding, extrusion blow-molding, injection molding, compression molding, casting, drafting, tentering, or blowing. The shaped article can comprise a sheet, film, tube, preform, or bottle. The shaped article can be a bottle.

Purified terephthalic acid and ethylene glycol for PET production can be purchased commercially or produced by methods known in the art. Crude, or non-hydrogenated, isophthalic acid can be produced by oxidizing m-xylene. The process is analogous to the process for producing crude terephthalic acid. The m-xylene may be continuously or batchwise oxidized in the primary oxidation reactor in the liquid phase, in the presence of an oxygen-containing gas such as air. In such a process, m-xylene, an oxidation catalyst composition, a molecular source of oxygen, and a solvent such as aqueous acetic acid are combined as a reaction medium in the reactor to produce a crude isophthalic acid reaction product. Typical oxidation catalyst compositions include a cobalt compound and a manganese compound, usually in combination with a promoter such as a bromine compound. See, for example, U.S. Pat. Nos. 2,833,816, 3,089,906, and 4,314,073, the disclosures of which are incorporated herein by reference. The process conditions are highly corrosive due to the acetic acid and bromine, and titanium is typically used in the process equipment. Because the liquid-phase oxidations of dialkyl aromatic compounds just described are highly exothermic reactions, they are commonly carried out in vented reaction vessels, the heat of reaction being removed by vaporization of the process solvent through the upper exit port.

The resulting crude isophthalic acid has limited solubility in the acetic acid solvent under the reaction conditions, and precipitates from the solvent to form a suspension. This crude isophthalic acid suspension includes isophthalic acid solids, a solvent acting as the suspending medium for the solids and containing a small amount of dissolved isophthalic acid; catalyst components; unreacted m-xylene; incompletely oxidized intermediate oxidation products such as meta-tolualdehyde (m-TAl), meta-toluic acid (m-TA), and 3-carboxybenzaldehyde (3-CBA); and organic impurities such as fluorenones that are known to cause discoloration. The crude isophthalic acid composition is discharged from the oxidation zone.

Other by-products of the liquid phase oxidation which are partially or completely removed from the reaction mixture in the oxidation reactor are the off-gases, which include water, solvent, unreacted oxygen and other unreacted gases found in the source of the molecular oxygen gas such as nitrogen and carbon dioxide, and additional amounts of carbon dioxide and carbon monoxide that are oxidative losses resulting in part from the catalytic decomposition of the solvent and other oxidizable compounds under the oxidation conditions. The off-gases are vented at the overhead of the oxidation reactor to a distillation column or a condenser to separate the solvent from the other off-gases such as water, carbon dioxide, carbon monoxide, nitrogen, gaseous bromine compounds such as methyl bromide, etc.

In one embodiment, the crude isophthalic acid leaving the oxidizer reactor is subject to flash crystallization followed by separation from the reaction solvent; the solvent may be recycled to the oxidizer. The crude isophthalic acid is then washed with acetic acid and/or water and then dried. This crude isophthalic acid may be stored or used directly in the production of the modified PET polymer. Significantly, this crude isophthalic acid does not undergo further purification. The crude isophthalic acid is not, as is typically done in the art, dissolved in water, hydrogenated over a noble metal catalyst, recrystallized, washed, and dried.

One embodiment of the non-hydrogenated isophthalic acid process is depicted in FIG. 1. M-xylene feed 22 is combined with mother liquor recycle 42 and acetic acid/water recycle 46 and fed to oxidation reactor 10. Air 24 is also fed to the oxidation reactor 10. Reactor effluent 30 is fed to high temperature post oxidation reactor 14. Air 26 and heat 50 are also added to high temperature post oxidation reactor 14. Effluent 34 from high temperature oxidation reactor 14 is fed to flash crystallizer 16. Effluent 38 from crystallizer 16, rich in isophthalic acid solids, is fed to solid/liquid separator 18. Mother liquor 42 from solid/liquid separator 18 can be recycled to oxidation reactor 10 as shown. Isophthalic acid solids are washed (not shown) and sent to product dryer 20. The non-hydrogenated isophthalic acid product 44 can be stored or used directly in embodiments of the present invention.

The overhead outlets of oxidation reactor 10, stream 28, high temperature post oxidation reactor 14, stream 32, and flash crystallizer 16, stream 36, are each sent to offgas treatment/water removal/environmental abatement zone 12. The acetic acid and some of the water recovered in zone 12 is recycled to oxidation reactor 10 via stream 46.

The polyester polymers can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

The molten polymer from the melt phase polymerization may be allowed to solidify and/or obtain any degree of crystallinity from the melt. Alternatively, the molten polymer can be first solidified and then crystallized from the glass.

The invention is further illustrated by the following examples. It will be understood that these examples are included merely for purposes of illustration and are not intended to limit the scope of the invention unless otherwise specifically indicated.

EXAMPLES

Proton nuclear magnetic resonance spectroscopy (1H NMR) was used to measure the oligomer mole ratio, percent (%) conversion, degree of polymerization (DP), mole percent (%) DEG, and mole percent (%) IPA. Mole Ratio is defined as the ratio of glycol moieties to acid moieties in the oligomer. Percent (%) conversion for the oligomer is defined as the mole percent of carboxylic acids converted to esters. Degree of polymerization (DP) is defined as the average molecular weight divided by the molecular weight of the repeat unit (for PET the molecular weight of the repeat unit is 192 g/gmole). The mole % DEG is based upon total moles of hydroxyl residues. The mole % IPA is based upon total moles of carboxylic acid residues.

Oligomer color measurements were performed in reflectance (specular included) using a HunterLab UltraScan XE (Hunter Associates Laboratory, Inc., Reston Va.), which employs diffuse/8° (illumination/view angle) sphere optical geometry. Results were reported using the CIELAB scale with the D65 illuminant and 10° observer. The spectrophotometer was standardized regularly and UV control was employed and maintained in calibration following the HunterLab recommendations. An optional glass port plate can be installed at the reflectance port to minimize contamination of the sphere. The glass port was not installed for oligomer color measurements. Oligomer color was measured on "discs". A small portion of molten oligomer was collected in a 2.5" diameter, ¾" deep aluminum pan which was set aside to cool to room temperature. The bottom of the "disc" of oligomer (that side against the bottom of the pan) was held up to the viewport of a Hunter UltraScan instrument.

Polymer powder color measurements were performed in reflectance (specular included) using a HunterLab UltraScan XE (Hunter Associates Laboratory, Inc., Reston Va.), which employs diffuse/8° (illumination/view angle) sphere optical geometry. Results were reported using the CIELAB scale with the D65 illuminant and 10° observer. The spectrophotometer was standardized regularly and UV control was employed and maintained in calibration following the HunterLab recommendations. An optional glass port plate was installed at the reflectance port to minimize contamination of the sphere. Powders were placed in an optical glass cell. Color was measured in the glass cell, a 33-mm path length optical glass cell, available from HunterLab. The powders were allowed to settle by vibrating the sample for 20 seconds using a laboratory Mini-Vortexer (VWR International, West Chester, Pa.). The glass cell was maintained flush against the reflectance port and covered with a black opaque cover. A single cell packing was evaluated and the cell was removed and replaced for a total of three measurements for each sample. The reported value should be the average of the triplicate measurements.

Color measurements were also taken of polymer discs. Three clear, molded discs were prepared from each of the polymer samples using a Daca MicroCompounder/MicroInjector. Each sample was dried overnight prior to molding. Drying was done at approximately 120° C. and 28 inches of water vacuum. The dried samples were then fed to the DACA unit. The approximate chip molding conditions were as follows: 278° C. screw temperature, 283° C. barrel temperature, 14° C. mold temperature, 120 psi injection pressure, 120 rpm screw speed, and 1.4 scfh nitrogen flow to the feed throat. Sufficient quantities of the sample being evaluated were extruded into the removable barrel to completely fill it. The entire contents were then purged and the barrel was filled again. Once the second fill had been accomplished the barrel was moved to the drive section of the DACA unit, where the air driven piston forced the molten polymer into the cooled disc mold. The resulting 65 mil thick disc with a 2.9 cm diameter was removed from the mold and the procedure was repeated until three discs were produced.

Polymer disc color measurement (L*, a*, b* and haze) was performed using a HunterLab UltraScan XE (Hunter Associates Laboratory, Inc., Reston Va.), which employs diffuse/8° (illumination/view angle) sphere optical geometry. The color scale employed was the CIE LAB scale with D65 illuminant and 10° observer specified. Three discs were stacked together to give a sample of approximately 200 mil (0.51 cm) thickness. The stacked discs were placed in the sample holder inside the instrument such that the area of largest surface area was placed perpendicular to the light source. The color measurements were made in the total transmission (TTRAN) mode, in which both light transmitted directly through the sample and light that is diffusely scattered is measured. Color in transmission at any thickness can be recalculated according to the following:

$$T_h = T_o 10^{-\beta h}$$

$$\beta = \frac{\log_{10}(T_o/T_d)}{d}$$

where $T_h$=transmittance at target thickness
$T_o$=transmittance without absorption
$\beta$=Absorption coefficient
$T_d$=transmittance measured for sample
h=target thickness
d=thickness of sample Haze is defined as the scattering of light within or at the surface of a nearly clear specimen, which is responsible for cloudy appearance seen in transmission. A transmission haze measurement is a ratio of the diffuse light to the total light transmitted by a specimen, and is calculated according to the following formula:

$$\text{Haze} = \left(\frac{Y_{Diffusetransmission}}{Y_{Totaltransmission}}\right) \times 100$$

The It.V. values described throughout this description are set forth in dL/g units as calculated from the inherent viscosity measured at 25° C. in 60% phenol and 40% 1,1,2,2-tetrachloroethane by weight. Polymer samples are dissolved in the solvent at a concentration of 0.25 g/50 mL. For samples in the Examples section, the viscosity of the polymer solutions is determined using a Rheotek Glass Capillary viscometer. A description of the operating principle of this viscometer can be found in ASTM D 4603. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where $\eta_{inh}$=Inherent viscosity at 25° C. at a polymer concentration of
0.5 g/100 mL of 60% phenol and 40% 1,1,2,2-tetrachloroethane by weight
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} \lim_{C \to 0}(\eta_{sp}/C) = \lim_{C \to 0}(\ln \eta_r)/C$$

where $\eta_{int}$=Intrinsic viscosity
$\eta_r$=Relative viscosity=$t_s/t_o$
$\eta_{sp}$=Specific viscosity=$\eta_r$−1

Instrument calibration involves triplicate testing of a standard reference material and then applying appropriate mathematical equations to produce the "accepted" Ih.V. values. The three values used for calibration shall be within a range of 0.010; if not, problems were corrected and testing repeated of standard until three consecutive results within this range were obtained.

Calibration Factor=Accepted Ih.V. of Reference Material/Average of Triplicate Determinations The intrinsic viscosity (It.V. or $\eta_{int}$) may be estimated using the Billmeyer equation as follows:

$$\eta_{int} = 0.5[e^{0.5 \times Corrected\ Ih.V.} - 1] + (0.75 \times Corrected\ Ih.V.)$$

The procedure for estimating intrinsic viscosity (Billmeyer relationship) is well understood by persons skilled in the art and may be found, for example, in J. Polymer Sci., 4, pp. 83-86 (1949).

Alternatively, the viscosity of the polymer solutions is determined using a Viscotek Modified Differential Viscometer. A description of the operating principle of the differential pressure viscometers can be found in ASTM D 5225. The uncorrected inherent viscosity ($\eta_{inh}$) of each sample is calculated from the Viscotek Model Y501 Relative Viscometer using the following equation:

$$\eta_{inh} = [\ln(P_2/KP_1)]/C$$

where
P₂=The pressure in capillary $P_2$
P₁=The pressure in capillary $P_1$
ln=Natural logarithm
K=Viscosity constant obtained from baseline reading
C=Concentration of polymer in grams per 100 mL of solvent The corrected Ih.V., based on calibration with standard reference materials, is calculated as follows:

Corrected Ih.V.=Calculated Ih.V.×Calibration Factor

IPA preparation—Non-hydrogenated IPA (IPA-2(a)-IPA-2(e)) for the examples was prepared by oxidizing m-xylene in a continuous bubble column oxidizer either on a commercial-scale or in a pilot-plant unit. Air was sparged near the base of the bubble column while catalyst and m-xylene were fed to the body of the bubble column. A reflux consisting primarily of acetic acid and water was introduced to the top of the column to reduce entrainment. The oxidizer typically operates at 158-160° C. with a liquid phase composition of 2100 ppm Co, 70 ppm Mn, 3000 ppm Br, 10-11% water with the balance acetic acid. PPM and percentage values are on a weight metal per weight of liquid phase basis. The reactor solution is typically 25% solids on a weight of solids per weight of reactor contents basis.

The oxidizer effluent was cooled via flash cooling to around 80° C. The IPA product was separated from the mother liquor in a centrifuge and washed with an acetic acid/water solution to remove catalyst. The IPA product was dried. IPA composition representative of non-hydrogenated IPA is given below in Table 1. The impurities listed are 3-carboxybenzaldehyde (3-CBA), cobalt (Co), 2,6-dicarboxyfluorenone (2,6-DFC), 2,7-dicarboxyfluorenone (2,7-DFC), dicarboxyanthroquinone (DCA), and moisture.

TABLE 1

Non-hydrogenated Isophthalic Acid Impurities

| Component | non-hydrogenated (IPA-2(a)) |
|---|---|
| 3-CBA | 1475 ppm |
| Co | 9.6 ppm |
| 2,6-DCF | 81 ppm |
| 2,7-DCF | 11 ppm |
| DCA | 4 ppm |
| Moisture | <0.1% |

Purified, or hydrogenated, IPA was purchased from Amoco in two different batches, IPA-1(a) and IPA-1(b). No further processing was done to the purified IPA.

PET preparation Poly(ethylene terephthalate), PET modified with various levels of isophthalate co-monomer was prepared from various sources of isophthalic acid. Purified IPA manufactured by BP-Amoco (IPA-1(a),(b)) was used as the control or hydrogenated example. IPA that was collected from Eastman Chemical Company's Kingsport manufacturing and pilot plant facilities, prior to the hydrogenation step, (IPA-2(a)-(e)) was used as examples of crude, non-hydrogenated isophthalic acid.

Comparative Example 1

The PET for Comparative Example 1 was prepared in a two step batch process using laboratory scale equipment. The initial step was carried out to produce a low DP product referred to as "oligomer". This product was prepared by the acid catalyzed esterification of isophthalic acid and terephthalic acid with ethylene glycol. All starting materials were used as received without further purification. No catalyst was charged with the acids and glycol. Table 2 below shows a typical charge used to prepare PET modified with 2 mole percent of isophthalic acid.

TABLE 2

Example Esterification Reactor Charge

| Component | Source | Mass Charged | Moles Charged |
|---|---|---|---|
| Purified terephthalic acid | BP-Amoco TA-22 | 651.35 | 3.92 |
| Isophthalic acid | BP-Amoco (IPA-1(a)) | 13.29 | 0.08 |
| Ethylene glycol | Eastman Chemical Company | 397.25 | 6.40 |

The starting materials were combined and mixed in a 2 liter beaker. After stirring for one to two minutes the mixture was aspirated into a Parr high pressure reactor through a ⅜" diameter ball valve in the reactor's head.

The esterification reactor was a 2 liter, pressure vessel constructed of 316 stainless steel. The unit was fitted with a heated, packed column for separation and removal of the volatile reaction by-product, water, from ethylene glycol. The column was connected to a water cooled condenser, which was in turn connected to a pressure control regulator that vented reactor pressure and/or permitted pressurization of the reactor using house nitrogen. The unit had a "turbine" style agitator to provide mixing of the contents.

The condensed liquid from the reaction was collected in a weighed receiver resting on a balance. The mass of condensate collected was used as a rough measure of the extent of reaction.

All esterification reaction parameters were monitored and controlled using a CAMILE® distributed data acquisition and control system. The CAMILE® system was programmed to implement the array given in Table 3. The temperature is the temperature set point for the reaction mixture. The column temperature is the temperature set point of the column wall. In this array, a "ramp" is defined as a linear change of temperature, pressure, stirring speed, or column temperature over time. For example, during stage 2 the pressure set point changes from 0 to 40 psig over a 5 minute period of time for a ramp of 8 psi/minute.

TABLE 3

Esterification Reactor Conditions

| Stage | Time (minutes) | Temperature (° C.) | Pressure (psig) gauge | Stirring rate (rpm) | Column Temp (° C.) |
|---|---|---|---|---|---|
| 1 | 0 | 25 | 0 | 1 | 25 |
| 2 | 5 | 25 | 40* | 180* | 25 |
| 3 | 60 | 245* | 40 | 180 | 25 |
| 4 | 5 | 245 | 40 | 180 | 150* |
| 5 | 200 | 245 | 40 | 180 | 150 |
| 6 | 25 | 245 | 0* | 180 | 150 |
| 7 | 1 | 245 | 0 | 0* | 25* |

*= ramp

After charging the feeds to the reactor flask and prior to the initiation of the reactor sequence, the reactor was purged three times with nitrogen. The purge procedure consisted of pressurizing the reactor to 30 psi and then venting the pressure. The reactor's contents were stirred at 200 rpm during this purge step. At the end or the third purge depressurization, the reaction sequence shown in Table 3 was initiated.

Following completion of the esterification reaction, the oligomer was removed from the reactor using the ram valve in the bottom of the unit. The majority of the hot oligomer was drained into a stainless steel pan and allowed to cool. A smaller portion was collected for color measurement in a 2.5" diameter, ¾" deep aluminum pan which was also set aside to cool to room temperature. After cooling the large portion of material was immersed in liquid nitrogen and reduced to a coarse powder by manually pulverizing it with a hammer. This coarse powder was used for all subsequent lab work. A portion of the powder was also submitted for routine analytical testing by proton nuclear magnetic resonance spectroscopy to determine the mole ratio, DEG content, percent conversion and degree of polymerization.

One hundred nineteen grams of the coarse oligomer prepared as described above were charged to a heavy-walled, 500 ml volume, round bottom flask for the melt phase polymerization. The theoretical yield of polymer is approximately one hundred grams based on this oligomer charge and the mole ratio value reported by NMR. One gram of a solution of antimony trioxide (Amspec) dissolved in ethylene glycol was also added at this point. Based on an expected yield of one hundred grams of polymer product and the nominal concentration of antimony in solution, the expected antimony level in the product was 250 parts per one million parts of polyester on a mass of antimony metal per mass of polyester basis.

A stainless steel stirrer (2" diameter paddle) was inserted into the flask and that was fitted with a polymer adapter head. The polymer adapter head included a nipple for the attachment of a nitrogen purge line, a septum port for injection of additives, a smooth bore tubular section for the stirring shaft and two standard taper 24/40 male joints; one for insertion into the flask's female joint and the second, oriented at a nominal 45° angle to the first, was connected to a section of glass tubing terminating at a vacuum condenser system. A Teflon tubular bushing was inserted into the smooth tubular bore section of the adapter and the stainless steel stirring shaft was passed through the inner diameter of this bushing. A section of rubber hose was fitted around the stirring shaft and over the outside diameter of the glass tubing. This assembly provided a low friction, vacuum tight seal between the stirring shaft and the adapter head of the reaction flask. The assembled apparatus was clamped into a polymerization "rig" and the stirring shaft connected to a ⅛ horsepower stirring motor. The polymerization rig included a molten metal bath capable of being raised to provide heat input to the flask. The overhead stirring motor was also capable of being raised or lowered to ensure that the stirrer's blade was fully immersed in the molten oligomer/polymer as the reaction was carried out.

Typical melt phase polymerization reaction conditions were as shown in the Table 4. As with the esterification sequence, reaction parameters were monitored and controlled using a CAMILE® system. The temperature is the temperature set point for the molten bath of Belmont metal that was raised to surround the flask. In this array, a "ramp" is defined as a linear change of temperature, pressure, or stirring speed.

TABLE 4

Polymerization Reaction Conditions

| Stage Number | Duration (minutes) | Temperature (° C.) | Stirring rate (rpm shaft) | System pressure (mm Hg) | N₂ Purge Rate (scfm) |
|---|---|---|---|---|---|
| 1 | 0.11 | 195 | 0 | 735 | 3 |
| 2 | 5 | 195 | 0 | 735 | 3 |
| 3 | 1 | 195 | 150* | 735 | 3 |
| 4 | 90 | 195 | 150 | 735 | 3 |
| 5 | 5 | 225* | 150 | 735 | 3 |
| 6 | 30 | 225 | 150 | 735 | 3 |
| 7 | 25 | 275* | 100* | 735 | 3 |
| 8 | 5 | 275 | 100 | 165* | 0* |
| 9 | 5 | 275 | 100 | 165 | 0 |
| 10 | 30 | 275 | 100 | 165 | 0 |
| 11 | 10 | 292* | 100 | 3.8* | 0 |
| 12 | 35 | 292 | 100 | 3.8 | 0 |
| 13 | 3 | 298* | 100 | 0.8* | 0 |
| 14 | 18 | 298 | 100 | 0.8 | 0 |
| 15 | 1 | 298 | 0* | 150* | 0 |

*= ramp

Fifteen parts per million of phosphorus was introduced to the molten polyester by delivering the appropriate mass of a 1 wt % mixture of phosphoric acid (Aldrich Chemical Co.) in ethylene glycol. The mixture was manually injected into the molten polymer mass during, preferably near the beginning of, Stage 9 as shown in Table 4 above. The injection was done using a long stainless steel needle fitted to a disposable syringe. The long needle allowed the solution to be introduced just above the level of the molten polyester.

At the end of the reaction sequence the metal bath was lowered and the polymer mass was allowed to cool. After ten to fifteen minutes the polymer had solidified and the heating bath was raised to re-melt part of the polymer and permit it to be pulled free of the flask walls. After cooling for an additional fifteen minutes, the flask was broken and the solid polymer mass was immersed in liquid nitrogen. The cold polymer mass was removed from the stirring rod using a hydraulic press fitted with a chisel attachment and then ground in a WILEY® mill. The mill was fitted with a screen having 3-mm diameter holes. The resulting coarsely ground polymer was collected and submitted for various analytical tests. Amorphous, transparent discs were molded for color and haze measurements as described herein above.

Table 5 shows oligomer properties and Table 6 shows polymer properties for Comparative Example 1. Comparative Examples 1(a) and 1(b) represent two polymer batches made using the oligomer of Comparative Example 1.

TABLE 5

Comparative Examples - Oligomer Properties

| Ex. # | IPA Source | Target IPA mole % | Mole Ratio | % Conversion | DP | DEG mole % | IPA mole % | L* | a* | b* |
|---|---|---|---|---|---|---|---|---|---|---|
| Comp. Ex. 1 | IPA-1(a) | 2 | 1.31 | 93.0 | 2.73 | 8.5 | 2.2 | 95.43 | −0.44 | 1.92 |
| Comp. Ex. 2 | IPA-1(a) | 2 | 1.37 | 95.0 | 2.62 | 8.4 | 2.0 | 95.47 | −0.51 | 1.58 |

TABLE 5-continued

Comparative Examples - Oligomer Properties

| Ex. # | IPA Source | Target IPA mole % | Mole Ratio | % Conversion | DP | DEG mole % | IPA mole % | L* | a* | b* |
|---|---|---|---|---|---|---|---|---|---|---|
| Comp. Ex. 3 | IPA-1(a) | 2 | 1.35 | 96.4 | 2.83 | 8.7 | 2.1 | 95.12 | −0.50 | 1.57 |
| Average | | 2 | 1.35 | 94.8 | 2.73 | 8.5 | 2.1 | 95.34 | −0.48 | 1.69 |
| Comp. Ex. 4 | IPA-1(a) | 3 | 1.38 | 94.6 | 2.58 | 8.8 | 2.8 | 95.24 | −0.75 | 1.67 |
| Comp. Ex. 5 | IPA-1(a) | 5 | 1.43 | 95.7 | 2.54 | 8.0 | 4.9 | 95.11 | −0.53 | 1.01 |
| Comp. Ex. 6 | IPA-1(a) | 7 | 1.46 | 95.3 | 2.39 | 7.6 | 7.3 | 94.79 | −0.64 | 1.78 |
| Comp. Ex. 7 | IPA-1(a) | 7 | 1.43 | 93.3 | 2.37 | 7.2 | 7.0 | 95.06 | −0.52 | 1.87 |
| Comp. Ex. 8 | IPA-1(a) | 10 | 1.51 | 95.7 | 2.24 | 7.2 | 10.1 | 94.44 | −0.68 | 1.80 |
| Comp. Ex. 9 | IPA-2(a) | 10 | 1.47 | 94.7 | 2.35 | 7.6 | 9.8 | 94.01 | −1.18 | 3.98 |

TABLE 6

Comparative Examples - Polymer Properties

| Ex. # | IPA used | Target IPA mole % | Sb (ppm) | P (ppm) | Co (ppm) | IV | L* ground | a* ground | b* ground | L* disc | a* disc | b* disc | Haze disc |
|---|---|---|---|---|---|---|---|---|---|---|---|---|---|
| Comp. Ex. 1(a) | IPA-1(a) | 2 | 239 | 16 | 0 | 0.592 | 88.82 | −0.28 | 0.69 | 85.38 | 0.21 | 3.79 | 7.03 |
| Comp. Ex. 1(b) | IPA-1(a) | 2 | 241 | 15 | 0 | 0.656 | 85.48 | −0.23 | 0.66 | 83.82 | 0.29 | 4.40 | 7.31 |
| Comp. Ex. 2(a) | IPA-1(a) | 2 | 239 | 16 | 0 | 0.624 | 86.49 | 0.12 | 1.61 | 84.81 | 0.37 | 4.72 | 6.23 |
| Comp. Ex. 2(b) | IPA-1(a) | 2 | 240 | 16 | 0 | 0.560 | 89.39 | −0.13 | 2.34 | 86.71 | −0.02 | 3.98 | 6.84 |
| Comp. Ex. 3(a) | IPA-1(a) | 2 | 236 | 15 | 0 | 0.587 | 87.29 | −0.47 | 3.10 | 85.52 | −0.11 | 5.25 | 7.50 |
| Comp. Ex. 3(b) | IPA-1(a) | 2 | 242 | 15 | 0 | 0.629 | 85.48 | −0.26 | 2.00 | 84.63 | 0.16 | 4.84 | 6.16 |
| Avg. | IPA-1(a) | 2 | 240 | 16 | 0 | 0.608 | 87.16 | −0.21 | 1.73 | 85.15 | 0.15 | 4.50 | 6.85 |
| Comp. Ex. 4 | IPA-1(a) | 3 | 238 | 16 | 0 | 0.593 | 88.83 | −0.55 | 0.93 | 85.75 | 0.05 | 3.58 | 6.55 |
| Comp. Ex. 5 | IPA-1(a) | 5 | 243 | 15 | 1 | 0.582 | 87.13 | −0.38 | 1.60 | 85.25 | 0.10 | 4.20 | 6.46 |
| Comp. Ex. 6 | IPA-1(a) | 7 | 241 | 13 | 0 | 0.673 | 86.24 | −0.81 | 0.36 | 84.16 | −0.06 | 3.73 | 10.68 |
| Comp. Ex. 8 | IPA-1(a) | 10 | 247 | 13 | 0 | 0.720 | 79.83 | −0.97 | 0.22 | 81.07 | −0.20 | 3.72 | 9.68 |
| Comp. Ex. 9 | IPA-2(a) | 10 | 239 | 13 | 0.9 | 0.700 | 84.00 | −1.3 | 1.64 | 81.00 | −0.36 | 6.43 | 38.82 |

Comparative Examples 2-8

Oligomers and polymers were made using the same procedure as Comparative Example 1 with Isophthalic Acid (IPA-1) in amounts ranging from 2 mole % to 10 mole %. Table 5 shows oligomer properties and Table 6 shows polymer properties for Comparative Examples 2-8. Comparative Examples 2(a) and 2(b) and Comparative Examples 3(a) and 3(b) represent two polymer batches made using the oligomer of Comparative Examples 2 and 3, respectively. No polymer was made from the oligomer of Comparative Example 7.

Examples 1-7

Oligomers and polymers were made using the same procedure as Comparative Example 1 using Isophthalic Acid that had not been hydrogenated. Properties of the oligomer and polymer examples over a range of levels of IPA-2 are giving in Tables 7 and 8, respectively. No polymer was made from the oligomers of Example 1 or Example 10.

TABLE 7

Examples - Oligomer Properties

| Ex. # | IPA Source | Target IPA mole % | Mole Ratio | % Conversion | DP | DEG mole % | IPA mole % | L* | a* | b* |
|---|---|---|---|---|---|---|---|---|---|---|
| Ex. 1 | IPA-2(a) | 2 | 1.32 | 94.2 | 2.81 | 9.0 | 2.2 | 95.84 | −0.63 | 1.6 |
| Ex. 2 | IPA-2(a) | 2 | 1.36 | 93.2 | 2.58 | 9.0 | 2.1 | 95.43 | −0.62 | 1.69 |
| Ex. 3 | IPA-2(a) | 2 | 1.36 | 95.1 | 2.71 | 8.4 | 2.0 | 95.16 | −0.51 | 1.67 |
| Average | | 2 | 1.35 | 94.2 | 2.7 | 8.8 | 2.1 | 95.48 | −0.59 | 1.65 |
| Ex. 4 | IPA-2(a) | 3 | 1.41 | 95.7 | 2.50 | 8.9 | 2.9 | 95.16 | −0.75 | 1.40 |
| Ex. 5 | IPA-2(a) | 5 | 1.45 | 95.1 | 2.45 | 8.8 | 4.8 | 94.84 | −0.91 | 1.89 |
| Ex. 6 | IPA-2(a) | 7 | 1.44 | 95.0 | 2.42 | 8.2 | 6.8 | 94.52 | −1.03 | 2.24 |
| Ex. 7 | IPA-2(a) | 7 | 1.48 | 97.9 | 2.60 | 9.1 | 6.7 | 95.20 | −1.04 | 2.27 |
| Ex. 8 | IPA-2(b) | 2 | 1.31 | 100 | 3.96 | 7.3 | 1.7 | 95.21 | −0.28 | 1.71 |
| Ex. 9 | IPA-2(b) | 2 | 1.25 | 94.8 | 3.24 | 7.8 | 2.1 | 94.91 | −0.37 | 1.85 |
| Ex. 10 | IPA-2(b) | 2 | 1.29 | 95.3 | 3.09 | 7.4 | 2.0 | 95.38 | −0.46 | 1.63 |

TABLE 8

Examples - Polymer Properties

| Oligomer # | IPA used | Target IPA mole % | Sb (ppm) | P (ppm) | Co (ppm) | IV | L* ground | a* ground | b* ground | L* disc | a* disc | b* disc | Haze disc |
|---|---|---|---|---|---|---|---|---|---|---|---|---|---|
| Ex. 2 | IPA-2(a) | 2 | 241 | 16 | 0 | 0.600 | 88.51 | −0.36 | 0.80 | 85.31 | 0.08 | 3.77 | 6.36 |
| Ex. 3 | IPA-2(a) | 2 | 237 | 18 | 0 | 0.597 | 86.66 | −0.35 | 0.61 | 84.85 | 0.23 | 3.57 | 6.24 |
| Avg. | IPA-2(a) | 2 | 240 | 17 | 0 | 0.595 | 87.49 | −0.36 | 0.76 | 85.17 | 0.16 | 3.67 | 6.74 |
| Ex. 4 | IPA-2(a) | 3 | 243 | 17 | 0 | 0.577 | 87.84 | −0.55 | 1.44 | 85.50 | 0.02 | 3.87 | 5.89 |
| Ex. 5 | IPA-2(a) | 5 | 242 | 16 | 1 | 0.589 | 88.51 | −0.83 | 1.42 | 85.76 | −0.07 | 3.59 | 5.91 |
| Ex. 6 | IPA-2(a) | 7 | 234 | 12 | 0.1 | 0.738 | 84.37 | −1.44 | 1.44 | 83.28 | −0.81 | 4.4 | 8.12 |
| Ex. 7 | IPA-2(a) | 7 | 242 | 13 | 1.3 | 0.647 | 84.91 | −0.9 | 1.53 | 84.37 | −0.19 | 4.3 | 7.5 |
| Ex. 8 | IPA-2(b) | 2 | 231 | 16 | 2 | 0.600 | 87.49 | −0.18 | 1.21 | 85.64 | 0.09 | 3.63 | 5.22 |
| Ex. 9 | IPA-2(b) | 2 | 231 | 14 | 2 | 0.617 | 88.16 | −0.11 | 2.17 | 85.65 | 0.04 | 4.79 | 6.96 |

Examples 8-9

Oligomers and polymers were made following the same procedure as Comparative Example 1 using Isophthalic Acid that had not been hydrogenated. Properties of the oligomer and polymer examples with a target 2 mole % level of IPA-3 are given in Tables 7 and 8, respectively.

Comparative Example 9

Oligomers and polymers were made following the same procedure as Comparative Example 1 using 10 mole % Isophthalic Acid that had not been hydrogenated. Properties of the oligomer and polymer of Comparative Example 9 are given in Tables 4 and 5, respectively. The polymer disc b* and haze values are highest for Comparative Example 9, polymer made with 10 mole % of the non-hydrogenated isophthalic acid (IPA-2), than for any other example polymer.

Comparative Example 10

The PET for Comparative Example 10 was prepared in a two step batch process using laboratory scale equipment. The equipment and procedures were the same as Comparative Example 1 except where noted. The antimony catalyst was charged to the esterification reactor with the acids and glycol such that 230 ppm on a weight basis of antimony metal would be in the resulting oligomer. Table 9 below shows a typical charge used to prepare PET modified with 3 mole percent of isophthalic modification.

TABLE 9

Example Esterification Reactor Charge

| Component | Source | Mass Charged (grams) |
|---|---|---|
| Purified terephthalic acid | BP-Amoco TA-22 | 967.05 |
| Isophthalic acid | BP-Amoco (IPA-1) | 29.91 |
| Ethylene glycol | Eastman Chemical Company | 595.87 |

All esterification reaction parameters were monitored and controlled using a CAMILE® distributed data acquisition and control system. The CAMILE® system was programmed to implement the array given in Table 10.

TABLE 10

Esterification Reactor Conditions

| Stage | Time (minutes) | Temperature (° C.) | Pressure (psig) | Stirring rate (rpm) | Column Temp (° C.) |
|---|---|---|---|---|---|
| 1 | 1 | 20 | 0 | 0 | 20 |
| 2 | 5 | 20 | 40* | 150* | 20 |
| 3 | 30 | 215* | 40 | 150 | 20 |
| 4 | 20 | 245* | 40 | 150 | 20 |
| 5 | 5 | 245 | 40 | 150 | 150* |
| 6 | 120 | 245 | 40 | 150 | 150 |
| 7 | 60 | 245 | 0* | 0* | 150 |

*= ramp

One hundred forty two and eight tenths (142.8) grams of the coarse oligomer prepared as described above were charged to a heavy-walled, 500 ml volume, round bottom flask for the melt phase polymerization. The theoretical yield of polymer is approximately one hundred twenty (120) grams based on this oligomer charge and the mole ratio value reported by NMR.

Typical melt phase polymerization reaction conditions were as shown in the Table 11. As with the esterification sequence, reaction parameters were monitored and controlled using a CAMILE® system. Fifteen parts per million of phosphorus was introduced to the molten polyester. The mixture was manually injected into the molten polymer mass at the end of Stage 5 as shown in Table 11 below.

TABLE 11

Polymerization Reaction Conditions

| Stage Number | Duration (minutes) | Temperature (° C.) | Stirring rate (rpm shaft) | System pressure (torr) | N₂ Purge Rate (scfm) |
|---|---|---|---|---|---|
| 1 | 1 | 225 | 25 | 760 (atmospheric) | 3 |
| 2 | 5 | 225 | 25 | 760 (atmospheric) | 3 |
| 3 | 20 | 265* | 50* | 760 (atmospheric) | 3 |
| 4 | 5 | 265 | 100* | 760 (atmospheric) | 3 |
| 5 | 5 | 285* | 100 | 760 (atmospheric) | 3 |
| 6 | 1 | 285 | 100 | 200* | 3 |
| 7 | 1 | 285 | 100 | 0.5* | 3 |
| 8 | 90 | 285 | 75* | 0.5 | 0* |
| 9 | 1 | 285 | 0* | 150* | 0 |

*= ramp

Table 12 shows oligomer properties and Table 13 shows polymer properties for Comparative Example 10.

TABLE 12

Comparative Examples - Oligomer Properties

| Ex. # | IPA Source | Target IPA mole % | Mole Ratio | % Conversion | DP |
|---|---|---|---|---|---|
| Comp. Ex. 10 | IPA-1(b) | 3 | 1.46 | 96.8 | 2.56 |
| Comp. Ex. 11 | IPA-1(b) | 3 | 1.47 | 96.2 | 2.39 |
| Comp. Ex. 12 | IPA-1(b) | 3 | 1.48 | 100 | 2.68 |
| Comp. Ex. 13 | IPA-1(b) | 3 | 1.49 | 97.2 | 2.45 |
| Comp. Ex. 14 | IPA-1(b) | 3 | 1.47 | 97.0 | 2.49 |
| Comp. Ex. 15 | IPA-1(b) | 3 | 1.49 | 95.3 | 2.34 |
| Average | IPA-1(b) | 3 | 1.48 | 97.1 | 2.49 |

TABLE 13

Comparative Examples - Polymer Properties

| Ex. # | IPA used | Target IPA mole % | Sb (ppm) | P (ppm) | IV | DEG (wt %) | L* powder | a* powder | b* powder |
|---|---|---|---|---|---|---|---|---|---|
| Comp. Ex. 10 | IPA-1(b) | 3 | 193 | 22 | 0.635 | 4.0 | 85.02 | −0.31 | 1.15 |
| Comp. Ex. 11 | IPA-1(b) | 3 | 203 | 23 | 0.637 | 4.2 | 86.18 | −0.52 | 1.73 |
| Comp. Ex. 12 | IPA-1(b) | 3 | 202 | 23 | 0.637 | 4.2 | 84.85 | −0.40 | 2.18 |
| Comp. Ex. 13 | IPA-1(b) | 3 | 208 | 22 | 0.621 | 4.1 | 84.36 | −0.48 | 2.69 |
| Comp. Ex. 14 | IPA-1(b) | 3 | 192 | 24 | 0.642 | 4.0 | 85.83 | −0.89 | 2.29 |
| Comp. Ex. 15 | IPA-1(b) | 3 | 198 | 22 | 0.649 | 4.2 | 83.45 | −0.30 | 2.32 |
| Avg. | IPA-1(b) | 3 | 199 | 23 | 0.637 | 4.1 | 84.95 | −0.48 | 2.04 |

Comparative Examples 11-15

Oligomers and polymers were made following the same procedure as Comparative Example 10 using Isophthalic Acid (IPA-1(b)) targeted at a 3 mole % level. Table 12 shows oligomer properties and Table 13 shows polymer properties for Comparative Examples 10-15.

Examples 11-19

Oligomers and polymers were made following the same procedure as Comparative Example 10 using Isophthalic Acid that had not been hydrogenated. Properties of the oligomer and polymer examples targeted at 3 mole % IPA-2 and using three different lots of IPA-2 are giving in Tables 14 and 15, respectively.

TABLE 14

Examples - Oligomer Properties

| Ex. # | IPA Source | Target IPA mole % | Mole Ratio | % Conversion | DP |
|---|---|---|---|---|---|
| Ex. 11 | IPA-2(c) | 3 | 1.49 | 96.6 | 2.39 |
| Ex. 12 | IPA-2(c) | 3 | 1.50 | 96.9 | 2.41 |
| Ex. 13 | IPA-2(c) | 3 | 1.48 | 95.03 | 2.32 |
| Average | | 3 | 1.49 | 96.2 | 2.37 |
| Ex. 14 | IPA-2(d) | 3 | 1.50 | 96.0 | 2.34 |
| Ex. 15 | IPA-2(d) | 3 | 1.49 | 97.6 | 2.46 |
| Ex. 16 | IPA-2(d) | 3 | 1.50 | 97.7 | 2.47 |
| Average | | 3 | 1.50 | 97.1 | 2.42 |
| Ex. 17 | IPA-2(e) | 3 | 1.52 | 97.4 | 2.44 |
| Ex. 18 | IPA-2(e) | 3 | 1.52 | 96.1 | 2.32 |
| Ex. 19 | IPA-2(e) | 3 | 1.48 | 96.8 | 2.42 |
| Average | | 3 | 1.51 | 96.8 | 2.39 |

TABLE 15

Examples - Polymer Properties

| Oligomer # | IPA used | Target IPA mole % | Sb (ppm) | P (ppm) | IV | DEG (wt %) | L* disc | a* disc | b* disc |
|---|---|---|---|---|---|---|---|---|---|
| Ex. 11 | IPA-2(c) | 3 | 193 | 23 | 0.624 | 4.0 | 86.39 | −0.59 | 1.97 |
| Ex. 12 | IPA-2(c) | 3 | 188 | 26 | 0.608 | 3.9 | 85.02 | −0.81 | 2.16 |
| Ex. 13 | IPA-2(c) | 3 | 176 | 22 | 0.637 | 4.2 | 81.06 | −0.22 | 1.00 |
| Average | IPA-2(c) | 3 | 186 | 24 | 0.623 | 4.0 | 84.16 | −0.54 | 1.71 |
| Ex. 14 | IPA-2(d) | 3 | 186 | 23 | 0.605 | 4.1 | 86.38 | −0.66 | 2.89 |
| Ex. 15 | IPA-2(d) | 3 | 207 | 24 | 0.652 | 3.8 | 84.37 | −0.75 | 1.86 |
| Ex. 16 | IPA-2(d) | 3 | 207 | 24 | 0.675 | 4.1 | 84.15 | −0.97 | 2.82 |
| Average | IPA-2(d) | 3 | 200 | 23 | 0.644 | 4.0 | 84.97 | −0.79 | 2.52 |
| Ex. 17 | IPA-2(e) | 3 | 195 | 25 | 0.646 | 3.9 | 84.26 | −0.74 | 2.46 |
| Ex. 18 | IPA-2(e) | 3 | 200 | 26 | 0.614 | 3.9 | 84.81 | −0.78 | 1.65 |
| Ex. 19 | IPA-2(e) | 3 | 202 | 19 | 0.609 | 4.1 | 83.42 | −0.62 | 2.31 |
| Average | IPA-2(e) | 3 | 199 | 23 | 0.623 | 4.0 | 84.16 | −0.71 | 2.14 |

What is claimed is:

1. A process for producing a modified PET polymer comprising: reacting non-hydrogenated isophthalic acid with terephthalic acid and ethylene glycol to produce the modified PET polymer comprising
   i. a carboxylic acid component comprising:
      a. about 0.5 mole % to about 7 mole % isophthalic acid residues;
      b. at least about 90 mole % terephthalic acid residues; and
   ii. a hydroxyl component comprising at least about 90 mole % ethylene glycol residues,
   based upon 100 mole % carboxylic acid residues and 100 mole percent hydroxyl component residues in the modified PET, and having a disc L* of at least about 60 and a disc b* of less than about 5.

2. The process of claim 1, wherein the modified PET polymer comprises:
   i. the carboxylic acid component comprising
      a. about 0.5 mole % to about 7 mole % of the isophthalic acid residues;
      b. at least about 93 mole % of the terephthalic acid residues; and
   ii. the hydroxyl component comprising at least about 95 mole % of the ethylene glycol residues,
   based on 100 mole percent of the carboxylic acid component residues and 100 mole percent of the hydroxyl component residues in the modified PET polymer.

3. The process of claim 1, wherein the carboxylic acid component comprises about 1 mole % to about 4 mole % of the isophthalic acid residues.

4. The process of claim 1, wherein the non-hydrogenated isophthalic acid comprises at least:
   i. about 100 ppm to about 10,000 ppm 3-CBA;
   ii. about 20 ppm to about 500 ppm fluorenones; or
   iii. at least about 50 ppm to about 10,000 ppm 3-CBA in combination with at least about 10 ppm to about 500 ppm fluorenones.

5. The process of claim 4, wherein the non-hydrogenated isophthalic acid comprises at least:
   i. about 500 ppm to about 2,000 ppm of the 3-CBA;
   ii. about 50 ppm to about 200 ppm of the fluorenones; or
   iii. at least about 100 ppm to about 2,000 ppm of the 3-CBA in combination with at least about 25 ppm to about 200 ppm of the fluorenones.

6. The process of claim 1, wherein the modified PET polymer has a disc L* of at least about 70.

7. The process of claim 6, wherein the modified PET polymer has a disc L* of at least about 80.

8. The process of claim 7, wherein the modified PET polymer has a disc L* of at least about 90.

9. The process of claim 1, wherein the modified PET polymer has an It.V. of at least about 0.72 dL/g to about 1.1 dL/g.

10. The process of claim 9, wherein the modified PET polymer has an It.V. of at least about 0.76 dL/g to about 1.1 dL/g.

11. The process of claim 10, wherein the modified PET polymer has an It.V. of at least about 0.80 dL/g to about 1.1 dL/g.

12. The process of claim 11, wherein the modified PET polymer achieves the It.V. in the melt phase.

13. The process of claim 1, further comprising: continuously
   i. reacting the non-hydrogenated isophthalic acid with the terephthalic acid and the ethylene glycol in an esterification reaction zone to produce an oligomer mixture;
   ii. further reacting the oligomer mixture to produce the modified PET polymer in a melt-phase polycondensation zone; and
   iii. optionally further increasing the modified PET polymer It.V. in a solid-state processing zone.

14. The process of claim 13, wherein a mixture of the non-hydrogenated isophthalic acid, the terephthalic acid, and the ethylene glycol are fed to the esterification zone.

15. The process of claim 13, wherein the non-hydrogenated isophthalic acid, the terephthalic acid, and the ethylene glycol are fed to the esterification zone in a feed system comprising a first mixture comprising the non-hydrogenated isophthalic acid and the ethylene glycol and a second mixture comprising the terephthalic acid and the ethylene glycol.

16. The process of claim 13, wherein the esterification reaction zone has a throughput of from 500 kg/hr to 175,000 kg/hr.

17. A process for producing a modified PET polymer comprising reacting non-hydrogenated isophthalic acid and terephthalic acid with ethylene glycol to produce the modified PET polymer having a disc L* of at least about 60 and a disc b* of less than about 5, wherein the modified PET polymer comprises:
   i. a carboxylic acid component comprising
      a. about 0.5 mole % to about 7 mole % isophthalic acid residues;
      b. at least about 90 mole % terephthalic acid residues; and
   ii. a hydroxyl component comprising at least about 90 mole % ethylene glycol residues based upon 100 mole % carboxylic acid component residues and 100 mole % hydroxyl component residues, wherein the non-hydrogenated isophthalic acid is produced by a process consisting essentially of:
      a. oxidizing m-xylene;
      b. crystallizing isophthalic acid;
      c. washing the crystallized isophthalic acid; and
      d. drying the washed isophthalic acid.

18. The process of claim 17, wherein the modified PET polymer comprises:
   i. the carboxylic acid component comprising
      a. about 0.5 mole % to about 7 mole % isophthalic acid residues;
      b. at least about 93 mole % terephthalic acid residues; and
   ii. a hydroxyl component comprising at least about 95 mole % ethylene glycol residues,
   based on 100 mole percent of the carboxylic acid component residues and 100 mole percent of the hydroxyl component residues in the modified PET polymer.

19. The process of claim 17, wherein the carboxylic acid component comprises about 1 mole % to about 4 mole % of the isophthalic acid residues.

20. The process of claim 17, wherein the non-hydrogenated isophthalic acid comprises at least:
   i. about 100 ppm to about 10,000 ppm 3-CBA;
   ii. about 20 ppm to about 500 ppm fluorenones; or
   iii. at least about 50 ppm to about 10,000 ppm 3-CBA in combination with at least about 10 ppm to about 500 ppm fluorenones.

21. The process of claim 17, wherein the modified PET polymer has a disc L* of at least about 70.

22. The process of claim 21, wherein the modified PET polymer has a disc L* of at least about 80.

23. The process of claim 17, wherein the modified PET polymer has an It.V. of at least about 0.72 dL/g to about 1.1 dL/g.

24. The process of claim 23, wherein the modified PET polymer has an It.V. of at least about 0.80 dL/g to about 1.1 dL/g.

25. The process of claim 24, wherein the modified PET polymer achieves the It.V. in the melt phase.

26. A process for producing a shaped article comprising:
   A. reacting non-hydrogenated isophthalic acid with terephthalic acid and ethylene glycol to produce a modified PET polymer comprising
      i. a carboxylic acid component comprising:
         a. about 0.5 mole % to about 7 mole % isophthalic acid residues;
         b. at least about 90 mole % terephthalic acid residues; and
      ii. a hydroxyl component comprising at least about 90 mole % ethylene glycol residues,
      based upon 100 mole % carboxylic acid residues and 100 mole percent hydroxyl component residues in the modified PET having a disc L* of at least about 60 and a disc b* of less than about 5; and
   B. forming a shaped article from the modified PET polymer of step (A).

27. The process of claim 26, wherein the modified PET polymer comprises:
   i. the carboxylic acid component comprising
      a. about 0.5 mole % to about 7 mole % of the isophthalic acid residues;
      b. at least about 93 mole % of the terephthalic acid residues; and
   ii. the hydroxyl component comprising at least about 95 mole % of the ethylene glycol residues,
   based on 100 mole percent of the carboxylic acid component residues and 100 mole percent of the hydroxyl component residues in the modified PET polymer.

28. The process of claim 26, wherein the carboxylic acid component comprises about 1 mole % to about 4 mole % of the isophthalic acid residues.

29. The process of claim 26, wherein the non-hydrogenated isophthalic acid comprises at least:
   i. about 100 ppm to about 10,000 ppm 3-CBA;
   ii. about 20 ppm to about 500 ppm fluorenones; or
   iii. at least about 50 ppm to about 10,000 ppm 3-CBA in combination with at least about 10 ppm to about 500 ppm fluorenones.

30. The process of claim 26, wherein the modified PET polymer has a disc L* of at least about 70.

31. The process of claim 30, wherein the modified PET polymer has a disc L* of at least about 80.

32. The process of claim 26, wherein the modified PET polymer has an It.V. of at least about 0.72 dL/g to about 1.1 dL/g.

33. The process of claim 32, wherein the modified PET polymer has an It.V. of at least about 0.80 dL/g to about 1.1 dL/g.

34. The process of claim 33, wherein the modified PET polymer achieves the It.V. in the melt phase.

* * * * *